United States Patent [19]

Fontana et al.

[11] 4,339,842
[45] Jul. 20, 1982

[54] COMBINATION CASTER AND FIXED SUPPORT

[75] Inventors: Frank J. Fontana, Stratford; Francis J. Forte, Huntington, both of Conn.

[73] Assignee: Stewart-Warner Corporation, Chicago, Ill.

[21] Appl. No.: 194,377

[22] Filed: Oct. 6, 1980

[51] Int. Cl.³ .............................................. B60B 33/06
[52] U.S. Cl. ......................................................... 16/32
[58] Field of Search ............................................ 16/32

[56] References Cited

U.S. PATENT DOCUMENTS 3,228,089 1/1966 Turner .................................... 16/32
4,143,442 3/1979 Harlang .................................. 16/35

Primary Examiner—Doris L. Troutman

[57] ABSTRACT

A combination caster and fixed support that supports an article either for rolling motion on a dual wheel assembly or alternatively supports the article on a floor engaging foot that raises the caster wheels from the floor. A central horn, having a vertical swivelling pintle, carries wheels on the opposite sides thereof supported on a common axle that permits the wheels to go up and down a limited distance relative to the horn to compensate for uneven floors. A threaded pad vertical support rod is received centrally in the horn between the wheels and carries a universally mounted channel-shaped pad at its lower end that selectively engages the floor as the threaded rod is lowered to raise the caster wheels off the floor. In the raised position of the foot the pad is locked in a tilted position between abutments on the lower end of the support rod and a lower surface on the horn so that the pad may easily pass over inclined floor surfaces.

17 Claims, 8 Drawing Figures

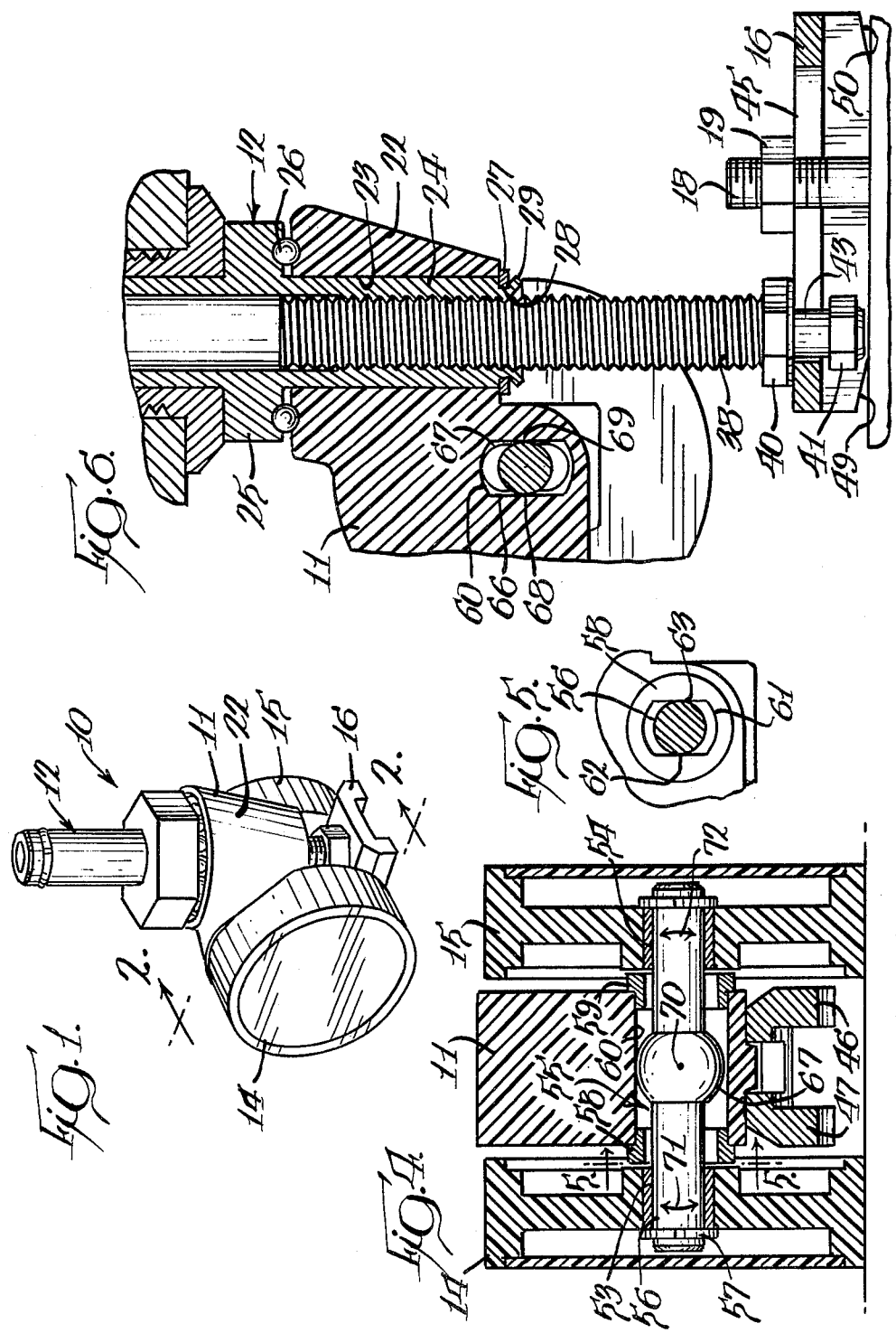

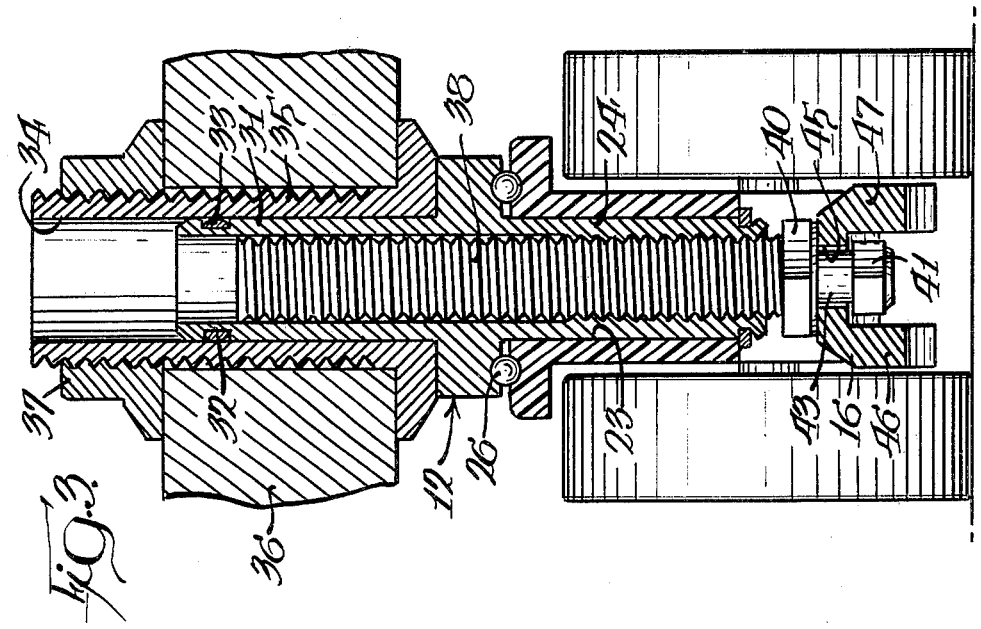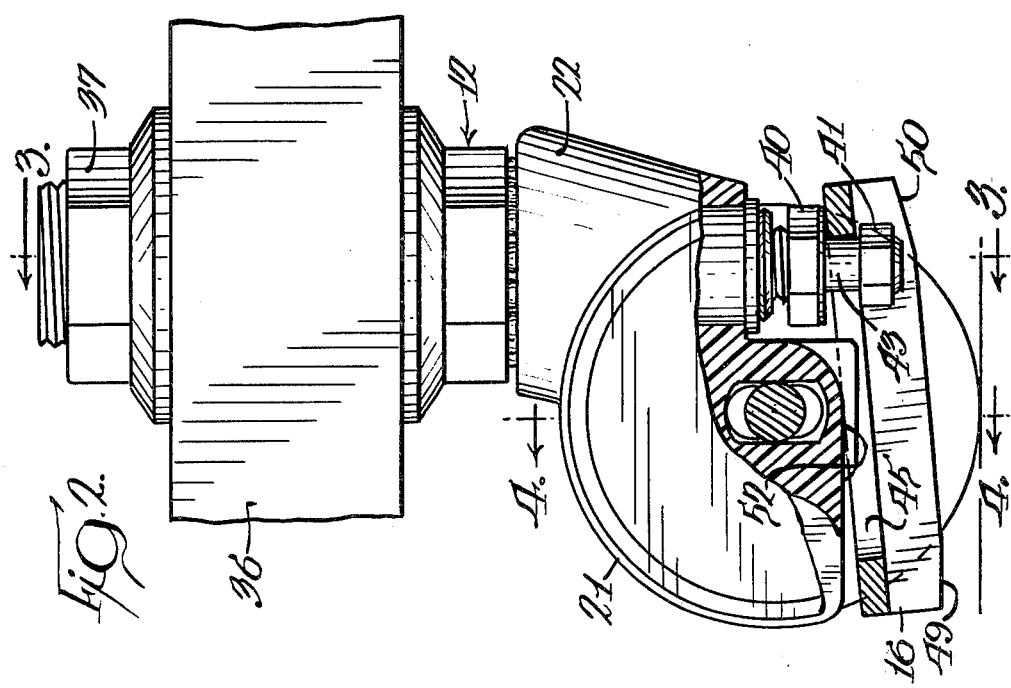

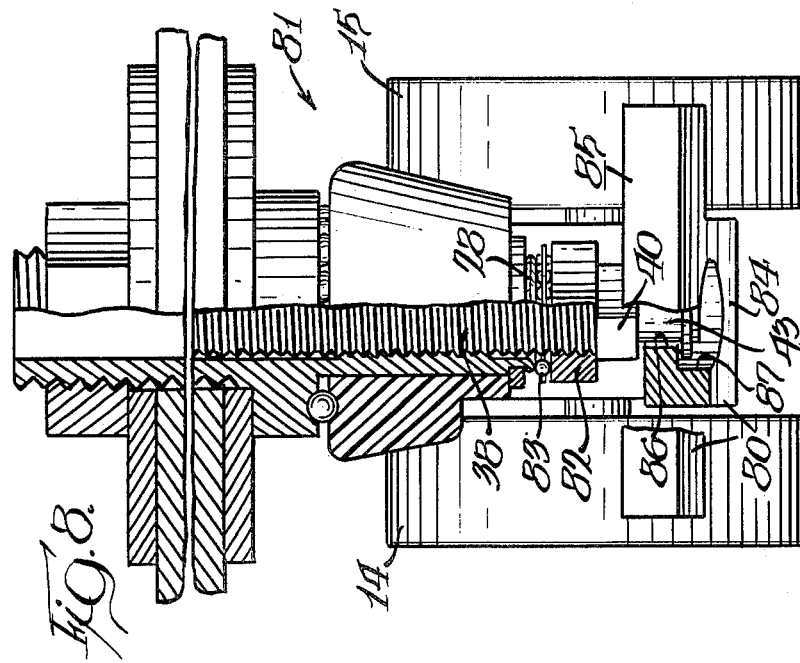
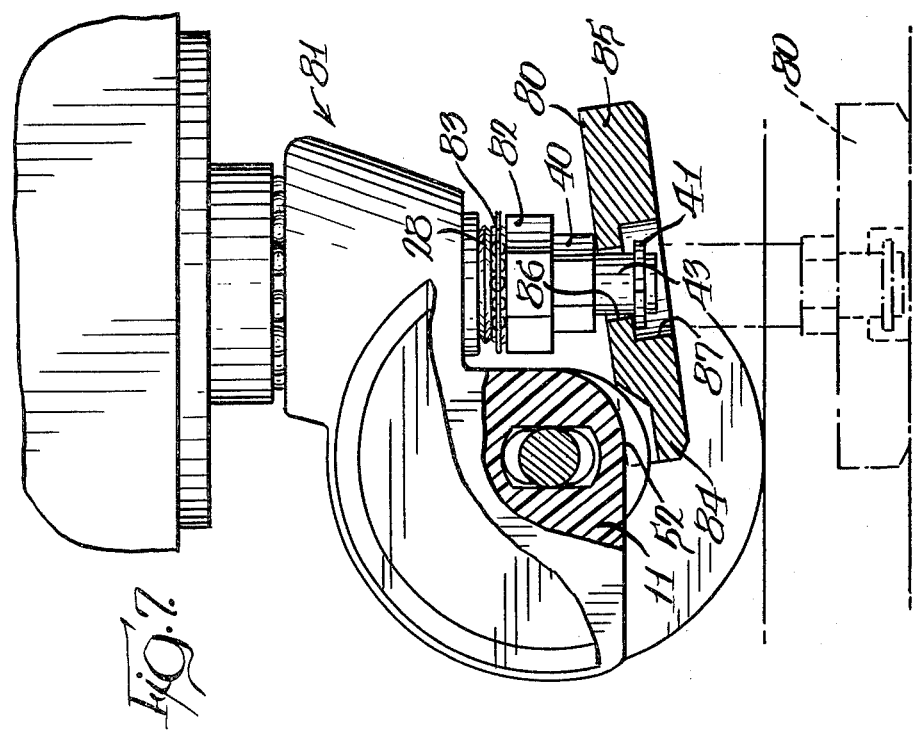

COMBINATION CASTER AND FIXED SUPPORT

BACKGROUND OF THE PRESENT INVENTION

Dual wheel casters, because of their lower material cost due to their increased load carrying capability, and also because of their greater mobility characteristics than single wheel casters, have found considerable success in the support of data processing equipment.

When the equipment is not being moved from one position to another, it is desirable to immobilize the equipment and toward this end caster assemblies have been provided with various anti-swivelling and wheel braking devices that prevent movement of the caster or its wheel and hence immobilize the supported equipment. While such anti-swivelling and braking devices are adequate for most applications, there are instances where these anti-swivelling and braking devices are inadequate, such as when the equipment is supported on a hard non-shock absorbing floor surface that is subject to periodic vibration. In such cases, even with the most superior anti-swivelling and wheel-locking devices, the supported equipment will "walk" on these hard surfaces as the floors vibrate.

To alleviate this problem, it has been suggested that a conventional dual wheel caster be provided with a vertically adjustable foot that engages the floor to raise the caster wheels off the floor to reduce the possibility of article creepage. These caster feet, or "pads" as they are sometimes referred to, also have apertures to receive floor studs that permit the pads to positively lock to the floor, thus completely eliminating the possibility of article creepage. These permanent floor studs are arranged in parallel fashion in a room that may, for example, house a great number of data processing units in closely spaced side-by-side relation. This prior combination caster and support pad, however, does not adequately compensate for uneven floor surfaces, and sometimes presents an obstruction to the combination caster assembly when climbing a ramp.

It is a primary object of this invention to provide a combination caster and fixed support pad that ameliorates the problems noted above in both anti-swivelling and braking devices, as well as the problems in prior combination and caster and foot assemblies.

SUMMARY OF THE PRESENT INVENTION

In accordance with the present invention, a combined dual wheel caster and fixed support pad assembly is provided that accommodates for floor unevenness and inclines by permitting limited rocking movement of the dual wheels as well as the universal movement of the support pad on spaced abutments on the lower end of a threaded pad support rod. The support is adjustable and moves the pad from an inactive, tilted upper position between the wheels to an active lower position in engagement with the floor.

Toward this end, a central enlarged arcuate horn member is provided that has a swivelling pintle sleeve vertically mounted therein adapted to be received in a suitable fitting in the lower side of the equipment to be supported. This pintle sleeve also forms an adjusting nut for a pad support rod that is threadedly received in the pintle sleeve that carries a pair of spaced nut-like abutments at its lower end. The pad itself is channel-shaped with an elongated slot in its upper surface adapted to receive both the fixed floor support studs which lock the pad in position, as well as the lower end of the threaded support rod. The lower edges of both ends of the support pad are chamfered to minimize the possibility of the pad encountering an obstruction when the caster wheels are operative and the pad is in its upper position. The pad and the threaded support rod are raised and lowered by rotation of a hexagonal nut-shaped portion on the pintle sleeve rotatably mounted on top of the horn. The lower end of the support rod carries the nut-like abutments spaced sufficiently apart so that the upper portion of the channel-shaped foot is loosely received therebetween defining a universal connection between the support pad and the support rod to accommodate for floor unevenness in the active portion of the pad in a very simple fashion.

When the caster wheels are lowered in preparation for movement of the associated equipment, the pintle sleeve is rotated threading the support rod upwardly, lowering the wheels into engagement with the floor and the pad upwardly between the wheels. Because the abutments on the lower end of the support rod loosely receive the central web of the pad, the pad tilts in its uppermost position, binding against the abutments on the lower end of the support rod and the lower surface of the horn, locking the support pad in a tilted position angled upwardly in the direction of normal motion of the caster assembly to minimize the possibility of the pad hitting an obstruction or an inclined surface that the caster encounters.

To further compensate for floor unevenness, the rocking feature of the opposed dual wheels is accomplished through the provision of a common axle for both wheels that extends through a flat-sided axle slot in the horn. The axle has enlarged central bearing spheroid integral therewith that has flat side surfaces engaging the flat vertical side surfaces in the axle bore in the horn to prevent the axle from shifting in a horizontal plane with respect to the horn, but permit limited rocking movement of the axle in a vertical plane passing through the axis of the axle. This enables each of the wheels to roll up and over small floor unevenness or bumps and thus permits both wheels to carry a substantially equal load even though the floor engaging one wheel is at a different elevation than the floor engaging the opposed wheel on the same caster.

In one embodiment of the present invention, the foot or pad is an elongated channel shaped member that in its raised position extends under the horn for substantially its entire length. In another embodiment of the present invention, the pad, rather than being channel-shaped, is substantially planar in configuration having a T-shaped floor engaging surface with the top of the "T" extending in front of the dual wheels. In this embodiment the lower end of the adjusting rod extends through an aperture in the support pad that communicates with an enlarged counterbore in the lower surface of the support pad.

Further objects of the present invention will become apparent upon reading the following description of the invention.

BRIEF DESCRIPTION OF THE DRAWINGS

FIG. 1 is a perspective view of a caster and fixed support pad assembly according to the present invention;

FIG. 2 is an enlarged side view, partly in section, of the caster and fixed support pad assembly with the pad in its upper inactive position, taken generally along line 2—2 of FIG. 1;

FIG. 3 is a cross-section taken generally along line 3—3 of FIG. 2;

FIG. 4 is a cross-section illustrating the wheel and axle assembly taken generally along line 4—4 of FIG. 2;

FIG. 5 is a fragmentary section illustrating a portion of the axle mounting taken generally along line 5—5 of FIG. 4;

FIG. 6 is a cross-section of the caster and fixed support pad assembly with the pad in its lower active position;

FIG. 7 is a side view, partly in section, of a caster and fixed support pad assembly according to another embodiment of the present invention; and FIG. 8 is a front view, partly in section, of the caster and fixed support pad assembly illustrated in FIG. 7.

DETAILED DESCRIPTION OF THE PREFERRED EMBODIMENTS

FIG. 1 is a perspective view of one embodiment of the present combined caster and fixed support pad assembly 10. As seen in FIG. 1, the caster and pad assembly 10 is seen to include a central horn 11, having a pintle sleeve 12 vertically mounted therein that is adapted to be received in a suitable fitting carried on the lower surface of the equipment to be supported. Pintle 12 permits swivelling of the caster and pad assembly 10 with respect to the equipment to provide turning mobility for the caster. A pair of opposed wheels 14 and 15 are mounted for rotation on the opposite sides of the horn 11 to define a dual wheel caster. A vertically positionable support pad 16 is provided for supporting the equipment with the wheels 14 and 15 off the floor in its lower active position to completely immobilize the equipment. As seen in FIG. 6, the support pad may be locked to the floor by one of many fixed floor studs 18, having threaded members 19 that lock the pad in position.

Viewing FIGS. 2 to 6, the horn 11 has an arcuate central portion 21 having a radius slightly greater than the radius of wheels 14 and 15 as seen clearly in FIG. 2. Horn 11 also has an enlarged generally frusto-conical boss portion 22 at its forward end and a vertical bore 23 that rotatably receives a lower internally threaded portion 24 of the pintle sleeve 12 as seen in FIGS. 3 and 6.

The pintle sleeve 12 has an integral hexagonal nut-like portion 25 that is rotatably mounted on the top surface of enlarged horn portion 22 by a plurality of ball bearings 26 in annular array on the upper surface of horn portion 22. The pintle sleeve 12 is axially retained in position by a lower thrust ring 27 seated on a reduced portion 28 on the lower end of sleeve portion 24 that has a flare 29 for retaining the ring 27 in position.

The upper end portion 31 of the pintle sleeve 12 has an annular recess 32 for receiving a friction locking ring 33 that maintains the pintle sleeve and the assembly in the proper position on the underside of the equipment, particularly when the equipment and the caster wheels are raised from the floor. The pintle portion 31 is received in a bore 34 in a threaded support sleeve 35 locked to a frame member 36 on the bottom of the equipment to be supported by a threaded nut member 37 on the upper surface of frame number 36.

As seen in FIGS. 3 and 6, the pad 16 is carried on the lower end of a threaded pad support rod 38 that is threadedly received in the lower portion 24 of the pintle sleeve 12. The lower end of the support rod 38 has spaced nut-like fixed abutments 40 and 41 carried thereby with a reduced stem portion 43 therebetween received within an elongated straight slot 45 in the foot 16. In the FIGS. 1 to 6 embodiment, the foot 16 is channel-shaped in configuration having side legs 46 and 47 (see FIGS. 3 and 4) having lower surfaces that selectively engage the floor. The ends of the legs 46 and 47 are chamfered as shown at 49 and 50 in FIGS. 2 and 6, to minimize the possibility of the foot 16 encountering an obstruction in the uppermost position of the foot illustrated in FIG. 2.

The nut-like abutments 40 and 41 are spaced sufficiently apart so that the foot or pad 16 when raised from the floor, may tilt approximately 15 degrees as shown in FIG. 2. This permits the pad 50 when raised to the position shown in FIG. 2, to be locked in position between the lower surface of abutment 40, the upper surface of abutment 41, and lower surface 52 on the central portion 21 of the horn. This 3-point engagement positively locks the pad 16 in position. The 15 degree tilt of the pad 15 in its uppermost inactive position, extending upwardly into the normal direction of forward motion of the caster and pad assembly 10, permits the caster and pad to climb ramps up to 15 degrees or more without the pad 16 encountering the floor surface.

Moreover, the spacing of the nut-like abutments 40 and 41 on the lower end of the pad support rod 38 permits the pad to freely pivot with respect to the support rod and defines the universal mount between the pad and the support rod to compensate for uneven floor surfaces when the pad is in its active position shown in FIG. 6. As shown in FIG. 6, with the pad in its lower position with the wheels 14 and 15 raised from the floor several inches, only the upper abutment 40 engages the upper surface of the pad 16, while the lower abutment 41 is spaced from the lower portion of the central web of the pad 15.

Viewing FIG. 2, the pad 16 is lowered from its uppermost active position shown by rotation of the nut-like portion 25 of the pintle sleeve 12. As the pad 16 approaches the floor, it may be shifted forwardly to the position shown in FIG. 6. Upon further rotation of the sleeve, abutment 40 will firmly engage the upper surface of the foot and continued rotation of the sleeve will cause the wheels 14 and 15 to leave the floor along with the horn 11 one or more inches completely immobilizing the associated equipment.

When it is desired to lower the wheels, the pintle sleeve 12 is rotated in the opposite direction raising the rod 38 and raising the foot 16. After the wheels 14 and 15 engage the floor surface, the lower abutment 41 moves the pad 16 upwardly. The pad 16 is then slid rearwardly toward the position shown in FIG. 2, and as the sleeve 12 continues to be rotated the pad assumes the tilted position illustrated in FIG. 2 wedged between the abutments 40 and 41 preventing pivotal movement thereof in one direction, and its engagement with the lower surface 52 of the horn 11 prevents its pivotal movement in the other direction.

The wheels are mounted for limited vertical rocking motion together to accommodate unevenness in floor surfaces, particularly where the caster and support pad are used on hard floors. Toward this end, the wheels 14 and 15 are mounted on cylindrical portions 53 and 54 of an axle 55 carried by the horn 11. Each of the wheels has a cylindrical bushing 56 rotatable on the cylindrical portions of the axle and the ends of the axle 55 have snap rings 57 seated in annular recesses therein to retain the wheels 14 and 15 in position. The axle extends through bushings 58 and 59 in the ends of an axle bore 60 in the horn. Each of these bushings 58 and 59, as seen in FIG. 5 has a vertically elongated opening 61 therein having flat side surfaces 62 and 63 that restrict the axle extension 56 to vertical movement.

As seen best in FIG. 6, the axle bore 60 in the horn is vertically elongated and has flat vertical side surfaces 66 and 67. The central portion of the axle 55 has an integral spheroid 67 that engages the horn bore 60 and has flat side surfaces 68 and 69 that engage the flat side surfaces 67 and 68 in the horn axle bore 60 to prevent pivotal movement of the axle 55 in a horizontal plane extending through the axis of the axle, but permit limited pivotal or rocking movement of the axle about the center 70 (see FIG. 4) of the spheroid portion 67 in a vertical plane. This rocking movement of the axle 55 as indicated by arrows 71 and 72 in FIG. 4, permits one of the wheels 14 and 15 to move upwardly over an unevenness in the floor independently of the other wheel.

As seen in FIGS. 7 and 8 depicting a second embodiment of the present caster and fixed support assembly, a support pad 80 having a generally T-shaped configuration may be substituted for the support pad 16 described in connection with the embodiment of FIGS. 1 to 6. Caster and support pad assembly 81 illustrated in FIGS. 7 and 8 is identical to that described above with respect to FIGS. 1 to 6, except for the support pad 80, thrust member 82 and thrust bearing 83 so that the following description will relate only to the additional parts with the understanding that the remaining parts are identical. The thrust member 82 is hexagonal and thrust bearing 83 is positioned between thrust member 82 and the lower flange 28 on the pintle sleeve 12 when the pad 80 is in its uppermost position as shown in FIGS. 7 and 8.

Pad 80 is generally T-shaped in configuration, having a central rearwardly extending leg portion 84 between wheels 14 and 15, and an integral cross portion 85 that extends in front of the wheels. The reduced stem portion 43 of the threaded rod 38 extends through a central aperture 86 in the pad 80 that communicates with an enlarged lower counterbore 87 that receives lower abutment 41 on the support rod. Pad 80 engages both abutments 40 and 41 in its raised position to tilt the pad 80 to the position shown in FIGS. 7 and 8, and lower surface 52 on the horn 11 engages the upper surface of pad leg portion 84 to positively lock the pad in its inactive position. The pad 80 is shown in its lowermost position in dotted lines in FIG. 7. The caster and support pad 81 shown in FIGS. 7 and 8 operates in the same manner as described above in connection with the caster and support pad 10 illustrated in FIGS. 1 to 6 so that no detailed description of the operation thereof is believed necessary.

We claim:

1. A combined dual wheel caster and support pad assembly comprising; horn means, a wheel supported on each side of the horn means for rotation, a pad support mounted for vertical adjusting movement in the horn means and having a lower thrust surface, a pad mounted on the pad support for pivotal movement, said pad support being movable downwardly to engage the thrust surface with the pad to lower the pad into engagement with the floor and raise the wheels from the floor, and means for locking the pad in an upward tilting position so that the pad does not interfere with obstacles when the wheels operatively engage the floor.

2. A combined dual wheel caster and support assembly as defined in claim 1, including a second thrust surface on the pad support engageable with the pad, said first and second thrust surfaces being spaced sufficiently so that the pad may freely pivot when the pad is in an intermediate position between the floor and the horn means, said first and second thrust surfaces limiting tilting movement of the pad in one direction when the pad is in the locked position, said pad being engageable with the horn means in the locked position to prevent movement of the pad in another direction.

3. A combined dual wheel caster and support assembly as defined in claim 2, including an adjusting sleeve mounted in the horn means, said pad support including a threaded member threadedly received in the adjusting sleeve, said first thrust surface being a first abutment adjacent the lower end of the threaded member, said pad having an elongated slot extending therethrough, said threaded member extending through the elongated slot in the pad so that the first abutment engages the upper surface of the pad, said second thrust surface being a second abutment on the threaded member engageable with the lower surface of the pad.

4. A combined dual wheel caster and support assembly as defined in claim 1, wherein the pad has an elongated channel-shape having an upper surface, an elongated slot in the upper surface receiving the pad support, the lower ends of the channel-shaped pad being tapered upwardly to provide improved floor clearance.

5. A combined dual wheel caster and support assembly as defined in claim 1, including an axle mounted in the horn means for supporting both of said wheels for rotation, said axle having a central pivotal connection with the horn means that permits pivotal tilting of the axle in a vertical plane passing through the axis of the axle.

6. A combined dual wheel caster and support assembly as defined in claim 5, wherein the horn means has a vertically elongated bore therethrough that receives the axle, said axle having an enlarged central portion engageable with the sides of the horn means for limited pivot movement of the axle in vertical plane.

7. A combined dual wheel caster and support pad, comprising; a horn member, a pintle assembly mounted in the horn member and adapted to be received in an article to be supported, an axle mounted in the horn member and extending laterally outwardly of the horn member, a wheel mounted on each of the laterally extending portions of the axle on the opposite sides of the horn member, said axle being mounted in the horn member for limited pivotal movement in a vertical plane so that both wheels may have rolling contact with the floor even though the floor may be uneven, and a pad mounted for movement in the horn member and selectively engageable with the floor to raise the wheels from the floor.

8. A combined dual wheel caster and support pad as defined in claim 7, wherein said axle has a central pivotal connection with the horn member that permits pivotal tilting of the axle in a vertical plane passing through the axis of the axle.

9. A combined dual wheel caster and support pad assembly as defined in claim 8, wherein the horn member has a vertically elongated bore therethrough that receives the axle, said axle having an enlarged central portion engageable with the sides of the horn member for limited pivotal movement of the axle in a vertical plane.

10. A dual wheel caster comprising; a horn member, a pintle assembly mounted in the horn member, a pintle assembly mounted in the horn member and adapted to be received in an article to be supported, an axle mounted in the horn member and extending laterally outwardly of the horn member, and a wheel mounted on each of the laterally extending portions of the axle on the opposite sides of the horn member, said axle being mounted in the horn member for limited pivotal movement in a vertical plane so that both wheels may have rolling contact with the floor even though the floor may be uneven.

11. A dual wheel caster assembly as defined in claim 10, wherein said axle has a central pivotal connection with the horn member that permits pivotal tilting of the axle in a vertical plane passing through the axis of the axle.

12. A dual wheel caster assembly as defined in claim 11, wherein the horn member has a vertically elongated bore therethrough that receives the axle, said axle having an enlarged central portion engageable with the sides of the horn member to limit pivotal movement of the axle to movement in a vertical plane.

13. A caster assembly, comprising; a horn member, a pintle mounted in the horn member adapted to be received by an article to be supported, an axle offset from the axis of the pintle mounted generally horizontally in the horn member, a bore in the horn member having a noncircular cross-section for receiving the axle, said axle having an enlarged central portion engaging the noncircular cross-section of the horn member bore that defines a pivot for the pivotal movement of the axle about a point in a vertical plane extending through the axis of the axle, a wheel rotatably mounted on the ends of the axle and on the opposite sides of the horn member so that when the wheels encounter an unevenness in the floor the axle will tilt permitting one of the wheels to be raised or lowered to maintain rolling contact of both wheels with the floor, an adjusting sleeve in the pintle assembly mounted for rotational movement with respect to the horn member and having an internally threaded bore, a rod threadedly received in the sleeve bore so that upon rotation of the sleeve the rod may be adjusted vertically, a pair of spaced abutments on the lower end of the rod and defining thrust surfaces, and a pad mounted on the rod between the spaced abutments with the abutments being sufficiently spaced so that the pad has limited pivotal movement with respect thereto, said horn member having a projection thereon engagable with the pad upon upward movement thereof to position and hold the pad in a tilted position extending upwardly in the direction of normal movement of the caster assembly.

14. A caster assembly, comprising; a horn member, a pintle mounted in the horn member adapted to be received by an article to be supported, an axle offset from the axis of the pintle mounted generally horizontally in the horn member, a bore in the horn member having a noncircular cross-section for receiving the axle, said axle having an enlarged central portion engaging the noncircular cross-section of the horn member bore that defines a pivot for the pivotal movement of the axle about a point in a vertical plane extending through the axis of the axle, and a wheel rotatably mounted on the ends of the axle and on the opposite sides of the horn member so that when the wheels encounter an unevenness in the floor the axle will tilt permitting one of the wheels to be raised or lowered to maintain rolling contact of both wheels with the floor.

15. A caster assembly, comprising; a horn member, a pintle mounted in the horn member adapted to be received by an article to be supported, an axle offset from the axis of the pintle mounted generally horizontally in the horn member, an adjusting sleeve mounted for rotational movement with respect to the horn member and having an internally threaded bore, a rod threadedly received in the sleeve bore so that upon rotation of the sleeve the rod may be adjusted vertically, a pair of spaced abutments on the lower end of the rod and defining thrust surfaces, and a pad mount around the rod between the spaced abutments. with the abutments being sufficiently spaced so that the pad has limited pivotal movement with respect thereto, said horn member having a projection thereon engageable with the pad upon upward movement thereof to position and hold the pad in a tilted position extending upwardly in the direction of normal movement of the caster assembly.

16. A caster assembly as defined in claim 15, wherein the pad is channel-shaped and extends between the wheels.

17. A caster assembly as defined in claim 13, wherein the pad is generally T-shaped in configuration having a first leg portion extending between the wheels and a second leg portion extending in front of the wheels.

* * * * *